United States Patent
Maeda et al.

(10) Patent No.: US 6,472,101 B1
(45) Date of Patent: Oct. 29, 2002

(54) NICKEL-HYDROGEN STORAGE BATTERY

(75) Inventors: Reizo Maeda, Moriguchi; Katsuhiko Shinyama, Higashiosaka; Yoshinori Matsuura, Hirakata; Mitsuzo Nogami, Tokushima; Ikuo Yonezu; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/509,425

(22) PCT Filed: Dec. 25, 1997

(86) PCT No.: PCT/JP97/04821

§ 371 (c)(1),
(2), (4) Date: Mar. 28, 2000

(87) PCT Pub. No.: WO99/17388

PCT Pub. Date: Apr. 8, 1999

(30) Foreign Application Priority Data

Sep. 30, 1997 (JP) .............................. 9-266170

(51) Int. Cl.⁷ ............................................... H01M 4/58
(52) U.S. Cl. ................................ 429/218.1; 429/218.2; 429/220; 429/223; 429/224
(58) Field of Search ........................... 429/218.1, 218.2, 429/220, 223, 224

(56) References Cited

U.S. PATENT DOCUMENTS

| | | | | |
|---|---|---|---|---|
| 5,861,225 A | * | 1/1999 | Corrigan et al. | 205/57 |
| 5,922,491 A | * | 7/1999 | Ikawa et al. | 429/218 |
| 6,057,057 A | * | 5/2000 | Yano et al. | 429/206 |
| 6,066,415 A | * | 5/2000 | Sakai et al. | 420/900 |
| 6,218,046 B1 | * | 4/2001 | Tanigawa | 429/223 |

FOREIGN PATENT DOCUMENTS

| | | |
|---|---|---|
| JP | 5-028992 | 2/1993 |
| JP | 5-047380 | 2/1993 |
| JP | 5-082127 | 4/1993 |
| JP | 7-073877 | 3/1995 |
| JP | 8-045508 | 2/1996 |
| JP | 9-190817 | 7/1997 |
| JP | 9-219192 | 8/1997 |

OTHER PUBLICATIONS

Patent Abstract of Japan No. 06–103973, Published Apr. 15, 1994 (abstract only).

* cited by examiner

*Primary Examiner*—Carol Chaney
*Assistant Examiner*—Dah-Wei Yuan
(74) *Attorney, Agent, or Firm*—Armstrong, Westerman & Hattori, LLP

(57) ABSTRACT

In a nickel-metal hydride storage cell, deterioration of a cell capacity at high temperature and degradation of a cycle characteristic are suppressed. The nickel-metal hydride storage cell of the invention comprises in a cell case, a positive electrode comprising a positive electrode active material composed mainly of nickel hydroxide powder, a negative electrode comprising a negative electrode active material composed mainly of hydrogen-absorbing alloy powder, and a separator interposed between the positive and negative electrodes and impregnated with an electrolyte, the nickel-metal hydride storage cell characterized in that the negative electrode active material comprises a copper compound, the positive electrode comprises an aggregate of coated particles each in which a coating layer comprising a sodium-containing cobalt compound is formed on a surface of a nickel hydroxide particle, and the positive electrode active material is such that an oxide or hydroxide of one of bismuth, calcium, ytterbium, manganese, copper, scandium, and zirconium, is added to the aggregate of coated particles.

10 Claims, 2 Drawing Sheets

NICKEL-HYDROGEN STORAGE BATTERY

TECHNICAL FIELD

This invention relates to a nickel-metal hydride storage cell, and more particularly to a composition of a positive electrode active material and a composition of a negative electrode active material.

BACKGROUND ART

Nickel-metal hydride storage cells employ a hydrogen-absorbing alloy that is capable of reversibly absorbing and desorbing hydrogen for a negative electrode material. Such nickel-metal hydride storage cells have a larger energy density per unit volume than conventionally used storage cells such as a lead cell and a nickel-cadmium cell, and also exhibit a high degree of tolerance to overcharging and overdischarging as well as an excellent cycle characteristic by its nature. For these reasons, nickel-hydrogen cells have become widely utilized in an electric power supply for a variety of appliances such as portable appliances and electric motors.

Nickel hydroxide is used as a positive electrode active material in such nickel-metal hydride storage cells. In a charge reaction, nickel hydroxide is converted to nickel oxyhydroxide, and in a discharge reaction, nickel oxyhydroxide is converted back to nickel hydroxide. However, when charging is performed at high temperature, oxygen is generated as a side reaction at the same time of the charge reaction by nickel hydroxide, and the charge reaction, in which nickel hydroxide is converted to nickel oxyhydroxide, is thereby impeded. As a result, a utilization factor of nickel hydroxide is reduced, causing a degradation in a positive electrode capacity.

In view of this problem, as a method for suppressing such a side reaction, for example, Japanese Unexamined Patent Publication Nos. 5-28992, and 6-103973 disclose a technique in which an yttrium compound or the like is added to a nickel positive electrode. According to the technique disclosed therein, an yttrium compound or the like is adsorbed on the surface of nickel oxide, and serves to increase an overvoltage, which is a competitive reaction in charging at high temperature, leading to a sufficient charge reaction of nickel hydroxide to nickel oxyhydroxide. Hence, a utilization factor of the positive electrode active material at high temperature is improved.

However, in a nickel-metal hydride storage cell, when charged at high temperature, a side reaction of a dissociation of hydrogen takes place in the negative electrode as well as the positive electrode. This side reaction causes a reduction in a utilization factor of the negative electrode active material, resulting in a decrease in a negative electrode capacity. The dissociated hydrogen also causes a decrease in a positive electrode capacity. Accordingly, even if a utilization factor of the positive electrode active material is improved by employing the above-described technique, a cell capacity as a whole cannot be sufficiently improved, since the cell capacity is limited by the negative electrode in which the capacity is degraded, or the dissociated hydrogen is absorbed in the positive electrode, causing a decrease in a positive electrode capacity.

DISCLOSURE OF THE INVENTION

The present invention intended to solve the foregoing problems. It is an object of the present invention to provide a nickel-metal hydride storage cell in which both a utilization factor of a positive electrode active material and a utilization factor of a negative electrode active material are improved at high temperature, a high capacity is maintained at high temperature, and an excellent cycle characteristic is achieved. In order to accomplish this and other objects of the invention, the following configurations are provided in a group of the invention.

(1) First Group of the Invention.

The present invention provides a nickel-metal hydride storage cell comprising in a cell-case, a positive electrode comprising a positive electrode active material composed mainly of nickel hydroxide powder, a negative electrode comprising a negative electrode active material composed mainly of hydrogen-absorbing alloy powder, and a separator interposed between the positive and negative electrodes and impregnated with an electrolyte, the nickel-metal hydride storage cell characterized in that the negative electrode active material contains a copper compound, and the positive electrode active material contains at least one compound selected from the group consisting of bismuth compound, calcium compound, ytterbium compound, manganese compound, copper compound, scandium compound, and zirconium compound.

In accordance with the configuration set forth above, the compound contained in, the positive electrode, such as bismuth and the like, serves to accomplish a sufficient charge reaction of nickel hydroxide to nickel oxyhydroxide at high temperature. The copper compound contained in the negative electrode serves to suppress a decrease in a utilization factor of the negative electrode active material (hydrogen-absorbing alloy) at high temperature, and to prevent a degradation of the negative electrode capacity. Therefore, it is made possible to prevent such undesirable effects that a cell which is initially positive-electrode-limited changes into a negative-electrode-limited cell at high temperature, and that a cell capacity is limited by the negative electrode having a smaller capacity. In other words, with the above-described configuration, an increase of the positive electrode capacity entirely leads to an increase of a cell capacity (a capacity which can be outputted from a cell as a whole). Therefore, it is made possible to solve such a problem in prior art that a sufficient cell capacity cannot be achieved even if the positive electrode capacity is improved.

In the above-described configuration, the at least one compound may be an oxide or hydroxide of one of bismuth, calcium, ytterbium, manganese, copper, scandium, and zirconium.

In addition, the copper compound may be an oxide or hydroxide of copper.

In addition, the positive electrode active material may comprise an aggregate of coated particles each in which a coating layer comprising a sodium-containing cobalt compound is formed on a surface of a nickel hydroxide particle, and the positive electrode active material may be such that the oxide or hydroxide of one of bismuth, calcium, ytterbium, manganese, copper, scandium, and zirconium, is added to the aggregate of coated particles.

In the configuration of employing the coated particles each particle in which a coating layer comprising a sodium-containing cobalt compound is formed on a surface of on a nickel hydroxide particle, the cobalt compound exists on the surface of the nickel hydroxide particle, and thereby electrical conductivity in the active material is effectively improved. As a result, the addition of a cobalt compound is minimized, and a proportion of nickel hydroxide (active material) in the positive electrode active material is made sufficient. In other words, in this configuration, it is possible to suppress a degradation in a theoretical capacity caused by the addition of cobalt compound, and thus an increase of electrical conductivity (an increase in an active material utilization factor) leads to a significant increase in an actual capacity of the positive electrode.

In addition, in the positive electrode active material in which an oxide or a hydroxide of such an element as bismuth and the like is added to the aggregate of the coated particles, a compound such as an yttrium and the like serves to suppress a diffusion of the cobalt compound into the inside of the nickel hydroxide particle, thus preventing such an occurrence that a concentration of the cobalt compound on the surface of the nickel hydroxide decreases as charge-discharge cycles proceed. Hence, by these effects, it is made possible to significantly improve a cell capacity, which is a total of the positive electrode performance and the negative electrode performance, as well as a cycle characteristic of the cell.

(2) Second Group of the Invention

The present invention also provides a nickel-metal hydride storage cell comprising in a cell case, a positive electrode comprising a positive electrode active material composed mainly of nickel hydroxide powder, a negative electrode comprising a negative electrode active material composed mainly of hydrogen-absorbing alloy powder, and a separator interposed between the positive and negative electrodes and impregnated with an electrolyte, the nickel-metal hydride storage cell characterized in that the negative electrode active material contains a copper compound, and the positive electrode active material is such that an yttrium compound is added to an aggregate of coated particles each in which a coating layer comprising a sodium-containing cobalt compound is formed on a surface of a nickel hydroxide particle.

The above-described configuration makes it possible to enhance an effect of suppressing the diffusion of cobalt compound into the inside of a nickel hydroxide particle and an effect of suppressing the side reaction on the surface of the nickel hydroxide particle, both effects caused by the yttrium compound. Therefore, a cell capacity at high temperatures and a cycle characteristic of the cell are more significantly improved.

In the above-described configuration of the cell, the yttrium compound may be an oxide or hydroxide of yttrium.

In addition, an amount of the yttrium compound to be contained may be 0.2 to 10 wt. % based of the weight of the positive electrode active material.

In addition, the copper compound may be an oxide or hydroxide of copper.

In addition, an amount of the copper compound may preferably be 0.5 to 20 wt. % based on the weight of the negative electrode active material.

Now, a more specific explanation for the above-described configurations is given below.

It is preferable that a copper compound to be added to the negative electrode active material as its constituting element be an oxide of copper such as $Cu_2O$, or a hydroxide of copper such as $Cu(OH)_2$. When such an oxide or hydroxide of copper is employed, in an electric potential range in which the hydrogen-absorbing alloy electrochemically absorbs and desorbs hydrogen in an alkaline electrolyte, the copper compound is made to exist in the form of metallic copper, which is highly conductive. Therefore, the. copper compound effectively functions as a conductivity enhancer. Thus, a utilization factor of the negative electrode active material is greatly increased by employing the oxide or the hydroxide of copper.

The amount of the copper compound to be added is preferable to be 0.5 to 20 wt. % based on the weight of the active material. If the amount of the copper compound is less than 0.5 wt. % based on the weight of the active material, a sufficient increase of conductivity cannot be attained. By contrast, if the amount of the copper compound is more than 20 wt. %, the effect of increasing conductivity by adding a copper compound is hindered by an adverse effect of decreasing the amount of hydrogen-absorbing alloy to be contained. In both cases, the effect of increasing conductivity by adding the copper compound and the effect of increasing a cell capacity at high temperature are not sufficiently achieved.

For the compound of one of bismuth, calcium, ytterbium, manganese, copper, scandium, zirconium, and yttrium to be added as a constituting element of the positive electrode, it is preferable to employ an oxide or a hydroxide of such elements, and more preferable to employ an oxide or a hydroxide of yttrium. The reason is that when an oxide or hydroxide of such elements is employed, even if an ionically dissociated substance other than the metal in the oxide or hydroxide of such elements is bonded with other components in the alkaline electrolyte, the resulting product by such a reaction causes little adverse effect on the cell reaction. Also, the oxide or hydroxide of yttrium is particularly preferable since the oxide or hydroxide of yttrium exhibits excellent effects of increasing an overvoltage and of preventing a diffusion of cobalt from the coating layer on the nickel hydroxide into the inside of nickel hydroxide.

Examples of the above-mentioned oxide of such elements as bismuth and the like include $Bi_2O_3$, $CuO$, $Sc_2O_3$, $ZrO_2$, $Yb_2O_3$, and $MnO_2$. Examples of the above-mentioned hydroxide include $Ca(OH)_2$, $Bi(OH)_3$, $Cu(OH)_2$. Examples of the oxide or hydroxide of yttrium include $Y_2O_3$, and $Y(OH)_3$.

The amount of the yttrium compound to be added as a constituting element of the positive electrode active material is preferable to be 0.2 to 10 wt. % based on the weight of the active material. When the amount of the yttrium compound is 0.2 to 10 wt. %, the yttrium compound effectively functions and consequently a utilization factor of the positive electrode active material increases. By contrast, if the amount of the yttrium compound is less than 0.2 wt. % of the weight of the active material, a diffusion of cobalt compound into the inside of the nickel hydroxide particle cannot be sufficiently suppressed. If the amount of the yttrium compound is more than 10 wt. %, an energy density per a weight of the active material is reduced by an adverse effect of decreasing a proportion of nickel hydroxide in the active material, and thereby the positive electrode capacity cannot be sufficiently increased.

It is to be noted that in a nickel-metal hydride storage cell according to the present invention, it is possible that compounds in the positive and negative electrodes (such as a copper compound in the negative electrode and a bismuth compound, a yttrium compound or the like in the positive electrode) exist as a simple substance of a metal after the cell is assembled. This is because such compounds in a cell change their forms by being oxidized and reduced by charging and discharging.

It is also noted that examples of hydrogen-absorbing alloy used in the present invention include a rare-earth element type hydrogen-absorbing alloy, a Zr—Ni type hydrogen-absorbing alloy, a Ti—Fe type hydrogen-absorbing alloy, a Zr—Mn type hydrogen-absorbing alloy, a Ti—Mn type hydrogen-absorbing alloy, and a Mg—Ni type hydrogen-absorbing alloy. In addition, other elements such as types of materials for a core for the positive and negative electrodes (a current collector) and a separator, compositions for the alkaline electrolyte, and the like are not particularly limited, and various types of known materials used for-nickel-metal hydride storage cells may be used. In addition, various types of cell structures may be employed for the cell according to the present invention.

BEST MODE FOR CARRYING OUT THE INVENTION

Figure 1:
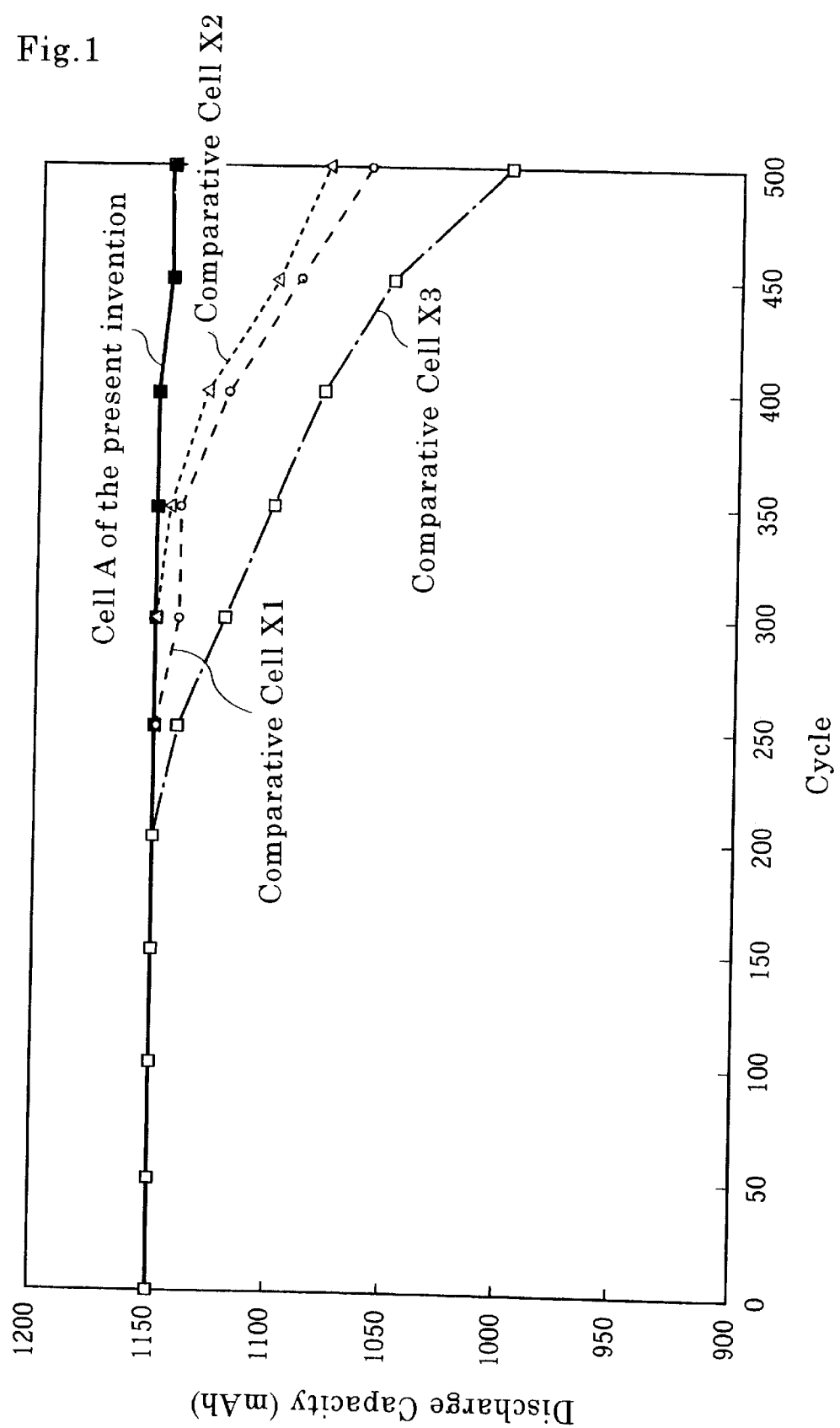
FIG. 1 is a graph showing cycle characteristics of a cell A of the present invention and comparative cells X1 to X3.

Now, the present invention is detailed based on an example thereof

EXAMPLES

Preparation of Positive Electrode

First, 100 g of nickel hydroxide powder was added to 1L of an aqueous solution of cobalt sulfate with a concentration of 13.1 g/L, and the mixture was stirred for 1 hour with adding to the mixture an aqueous solution of sodium hydroxide with a concentration of 40 g/L so that pH of the mixture was kept at 11. Monitoring of pH was performed with the use of a glass electrode provided with an automatic temperature compensator (a pH meter). By this operation, a cobalt compound is deposited such that the cobalt compound surrounds a surface of a nickel hydroxide particle. The resulting deposit was collected by filtration, washed with water, and dried to prepare an aggregate of coated particles each particle in which a layer of a cobalt hydroxide is coated on the surface of a nickel hydroxide particle (the average particle diameter being approx. 10 $\mu$m).

Secondly, the aggregate of coated particles and an aqueous solution of 25 wt. % of sodium hydroxide were mixed with a weight ratio of 1:10, and the mixture was then heat-treated at 85 °C. for 8 hours in an atmosphere containing oxygen. Thereafter, the treated coated particles were washed with water, and then dried at 65 °C. Thereby, positive electrode active material powder (added components not yet added) was prepared, the positive electrode active material powder being an aggregate of coated particles having an average particle diameter of approximately 10 $\mu$m in which a coating layer comprising a sodium-containing cobalt compound is coated on the surface of a nickel hydroxide particle.

Thereafter, 98.8 wt. % of the positive electrode active material powder, 1 wt. % of yttrium sesquioxide ($Y_2O_3$), and 0.2 wt. % of hydroxypropylcellulose as a binder were mixed. Then, 100 parts by weight of the resulting mixture and 50 parts by weight of water, which is for adjusting viscosity, were mixed, and thus a paste was prepared. The paste was coated onto a porous substrate made of a foamed metal plated with nickel (porosity: 95%, average diameter of pores: 200 $\mu$m) and then dried to form an electrode substrate. Thereafter, the electrode substrate coated with the positive electrode active material was formed to have a length of 70 mm, a width of 40 mm, and a thickness of 0.6 mm. Thus, a nickel positive electrode according to the invention was prepared.

Preparation of Negative Electrode

First, a commercially available misch metal (Mm: a mixture of rare earth elements such as La, Ce, Nd, Pr, and the like), nickel (Ni), cobalt (Co), aluminum (Al), manganese (Mn), were mixed so that the elementary ratio becomes 1:3.2:1:0.2:0.6 respectively. Then the mixture was fused at 1500° C. with the use of a high-frequency induction furnace, and then the fused matter was cooled down. Thus, an ingot of hydrogen-absorbing alloy represented by a compositional formula $MmNi_{3.2}Co_{1.0}Al_{0.2}Mn_{0.6}$ was prepared. Then, the ingot of hydrogen-absorbing alloy was pulverized,.and a hydrogen-absorbing alloy powder having an average particle diameter of 50 $\mu$m was thereby obtained.

Thereafter, 89.5 wt. % of the hydrogen-absorbing alloy powder and 10 wt. % of copper (I) oxide ($Cu_2O$) as a conductivity enhancer, 0.5 wt. % of polyethylene oxide (PEO) as a binder were mixed. Then, 100 parts by weight of the mixture and 20 parts by, weight of water for adjusting a viscosity were mixed to prepare a paste. The paste was coated to a substrate composed of a nickel-plated punched metal, and the coated substrate was dried and rolled. Thus, a negative electrode having a plate-like shape was prepared.

Preparation of Cell

The foregoing positive and negative electrodes were wound with a separator made of a non-woven polyolefin cloth being interposed therebetween to prepare a spirally-wound electrode assembly. The spirally-wound electrode assembly was then enclosed into a cell case, and the cell case was filled with an electrolyte composed of 30 wt. % of KOH (2.4 g). Thus a positive-electrode-limited nickel-metal hydride storage cell having a theoretical capacity of 1150 mAh was produced. The storage cell thus prepared is hereinafter referred to as a cell A of the present invention.

Comparative Example 1

A comparative cell X1 in accordance with Comparative Example 1 was prepared in the same manner as in the foregoing Example except that yttrium sesquioxide was not added in preparing the positive electrode.

Comparative Example 2

A comparative cell X2 in accordance with Comparative Example 2 was prepared in the same manner as in the foregoing-Example except that copper (I) oxide was not added in preparing the negative electrode.

Comparative Example 3

A comparative cell X3 in accordance with Comparative Example 3 was prepared in the same manner as in the foregoing Example except that yttrium sesquioxide was not added in preparing the positive electrode and that copper (I) oxide was not added in preparing the negative electrode.

EXPERIMENT 1

Using the foregoing cell A of the present invention and the comparative cells X1–X3, a high-temperature charge characteristic of each cell was measured under the charge-discharge conditions set forth below. The result is shown in Table 1 below. In measuring the high-temperature charge characteristic, a high-temperature charge rate R was defined as an index for measuring readiness of charging at high temperature, as shown in Expression 1 below, and the high-temperature charge rate R of each of the cells was measured.

High Temperature Charge Rate $R = C2/C1 \times 100$ (%)     Expression 1

Charge-Discharge Condition (1) Charge: 0.1 A×16 hours, ambient temperature=25° C.

Discharge: 0.1 A end of discharge voltage=1V ambient temperature=25 ° C.

The discharge capacity in this condition is defined as C1.

(2) Charge: 0.1A×16 hours, ambient temperature=50 ° C.

Discharge: 0.1 A end of discharge voltage =1V ambient temperature=25° C.

The discharge capacity in this condition is defined as C2.

TABLE 1

| Cell | High-temperature Discharge Rate R (%) |
|---|---|
| Cell A | 60 |
| Comparative Cell X1 | 42 |
| Comparative Cell X2 | 56 |
| Comparative Cell X3 | 42 |

As apparent from-Table 1, the cell A of the present invention and the comparative cell X2, in both of which an yttrium compound (yttrium sesquioxide) is added to the positive electrode, exhibited a high-temperature discharge rate R higher than those of the comparative cells X1 and X3, in both of which no yttrium compound is contained in the positive electrode. Moreover, the cell A of the present invention, in which an yttrium compound is added to the positive electrode and a copper compound (copper oxide) is added to the negative electrode, exhibited an even higher high-temperature charge rate R than that of the comparative cell X2, in which an yttrium compound is added to the positive electrode but no copper compound is contained in the negative electrode.

Only the difference between the cell A of the present invention and the comparative cell X2 is whether or not a copper compound is added to the negative electrode, and likewise, only the difference between the comparative cell X1 and the comparative cell X3 is whether or not a copper compound is added to the negative electrode. However, although the cell A of the present invention shows a higher high-temperature charge rate R than that of the comparative cell X2, the comparative cells X1 and X3 show no difference in their high-temperature charge rates R. From this comparison, it is appreciated that the addition of a copper compound to the negative electrode, alone, is not sufficient for improving a high-temperature charge characteristic, and that the effect of the addition of a copper compound to the negative electrode emerges only in the case where an yttrium compound is added to the positive electrode.

Figure 2:
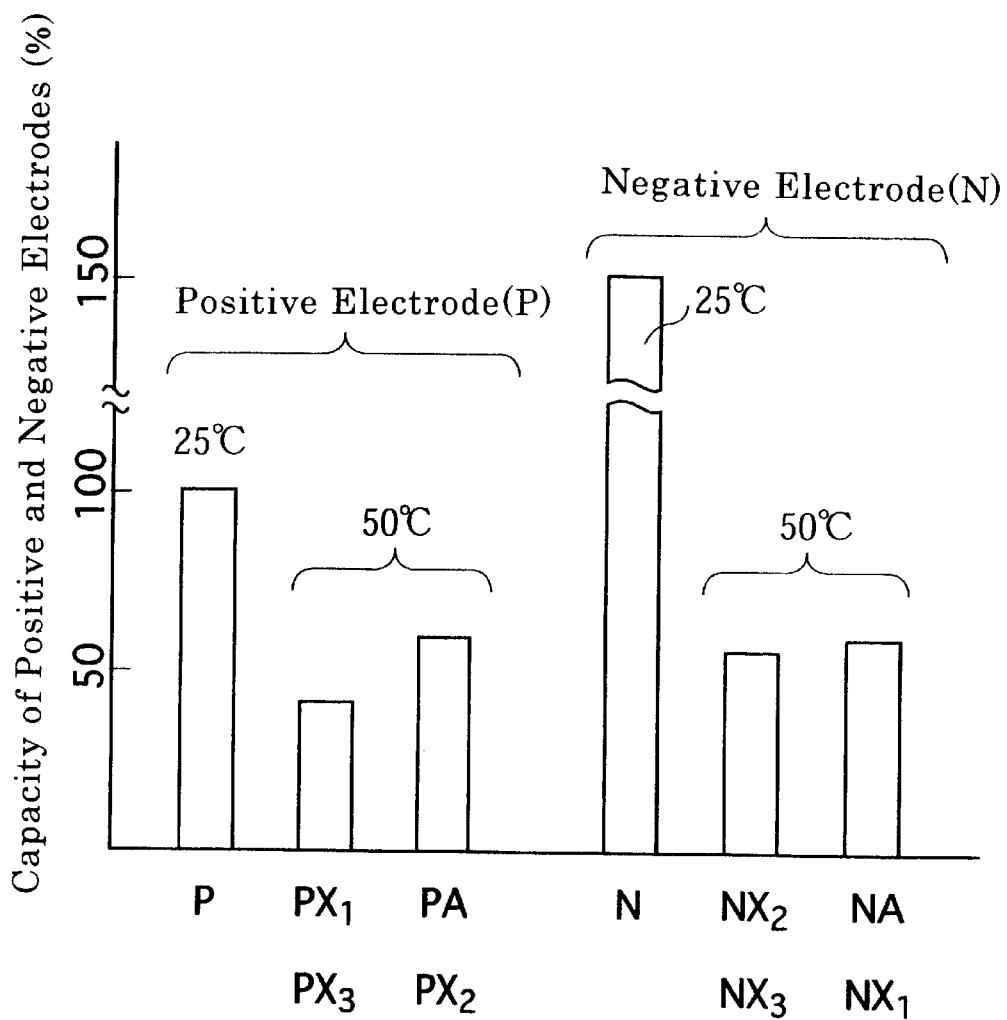
FIG. 2 is a graph illustrating features of the present invention.

Now, referring to FIG. 2, more detailed discussion is given in the following. In FIG. 2, a capacity of each of the above-described cells is schematically shown with respect to the relationship with the additives (yttrium compound or copper compound). It is to be understood that this figure only exemplifies a concept of the invention, and configurations of positive and negative electrodes, configurations of cells and the like are not limited by the figure.

A positive-electrode-limited cell in which a negative electrode capacity 5 is 150% when a positive electrode-capacity is 100% is shown as an example of an initial condition of the positive and negative electrode combination in the cell. In a cell with this setting, a cell capacity of the cell is a positive electrode capacity P at room temperature (25° C.). However, at high temperature (50° C.), the rate of a capacity decrease differs between the positive and negative electrodes, and therefore, the cell capacity in each of the cells is restricted by an electrode that shows a smaller capacity. Note here that there are four combinations of positive and negative electrodes in the case of employing a negative electrode with a copper compound, a negative electrode with no copper compound, a positive electrode with an yttrium compound and the like, and a positive electrode with no yttrium compound and the like.

In a cell in which an yttrium compound is not added in the positive electrode (the comparative cell X1 and the comparative cell X3), the positive electrode (P X1 and PX3 in FIG. 2) shows a low charge acceptance characteristic at high temperature, and therefore a utilization factor of the positive electrode active material is not increased. Accordingly, a positive electrode capacity at 50 ° C. significantly decreases and becomes less than the capacities of any of the negative electrodes (FIG. 2), and the positive electrode capacity limits the capacity of the cell regardless of whether or not a copper oxide is added in the negative electrode. Hence, no difference in the high-temperature charge rate R is made between the comparative cell X1 and the comparative cell X3.

On the other hand, in a cell in which an yttrium is added in the positive electrode (the cell A of the present invention and the comparative cell X2), the positive electrode (NA and NX2 in FIG. 2) shows a high charge acceptance characteristic in high-temperature charging, and therefore a utilization factor of positive electrode active material is increased, resulting in an increase in the positive electrode capacity. However, in a cell employing the combination of a positive electrode with an yttrium compound and a negative electrode with no copper compound (NX2 in FIG. 2) such as the comparative cell X2, a charge acceptance characteristic of the negative electrode is low in high-temperature charging, and therefore the negative electrode capacity is significantly decreased. Accordingly, the positive electrode capacity becomes higher than the negative electrode capacity, and the cell becomes negative-electrode-limited. Hence, in this case, an increase in the positive electrode capacity does not result in an increase in the cell capacity, and therefore the cell capacity cannot be sufficiently improved.

By contrast, in a cell in which a positive electrode containing an yttrium compound (PA in FIG. 2) and a negative electrode containing a copper compound (NA in FIG. 2) are employed in combination (the cell A of the present invention), a charge acceptance characteristic of the negative electrode also increases, and accordingly the negative electrode capacity as well as the positive electrode capacity increases. Thus, the cell remains to be a positive-electrode-limited cell, and therefore the positive electrode capacity is the cell capacity. Hence, in this case, an increase of the positive electrode capacity equals to an increase of the cell capacity, resulting in a remarkable improvement in the cell capacity.

In summary, in the cell A of the present invention, a higher high-temperature charge rate R than those of the comparative cells X1 and achieved, since the cell capacity is increased corresponding to the increase of the positive electrode capacity, which results from containing an yttrium compound in the positive electrode. As for the comparison with the comparative cell X2, the cell A of the present invention also achieves a higher high-temperature charge rate R than that of the comparative cell X2, since the increase of the negative electrode capacity, which results from containing a copper compound in the negative electrode, serves to present the cell from becoming a negative-electrode-limited cell, and the increase of the positive electrode capacity directly leads to the increase of the cell capacity.

EXPERIMENT 2

Using the cell A of the present invention and the comparative cells X1 to X3, a cycle characteristic of each of the cells was measured in the following charge-discharge condition. The result is shown in FIG. 1.

Charge-Discharge Condition

Condition of Charge:

Charge is conducted with a charge current of 1 A, and is ended when $-\Delta V$ in accordance with a method of detecting $-\Delta V$ becomes 10 mV.

Condition of Discharge:

Discharge is conducted with a discharge current of 1 A, and is ended when a cell voltage becomes 1 V.

It is appreciated that the cell A of the present invention in which the positive electrode contains an yttrium compound and the negative electrode contains a copper compound, exhibited an improved cycle characteristic over the comparative cells X1 to X3.

This is attributed to the following reason.

In the comparative cell X1, since an yttrium compound is not contained in the positive electrode, when the cell is charged at high temperature, an oxygen gas is generated from the positive electrode at the late stage of charging. As a result, the negative electrode is oxidized by the generated oxygen, and the negative electrode performance is thereby degraded. In the comparative cell X2, since a copper compound, which serves as a conductivity enhancer, is not contained in the negative electrode, a current collecting performance of the negative electrode is deteriorated as a charge-discharge cycle proceeds, and a utilization factor of the active material is thus decreased. In the comparative cell X3, an yttrium compound is not added in the positive electrode, and a copper compound serving as a conductivity enhancer is not added in the negative electrode either. Therefore, the performances of both positive and negative, electrodes are degraded. Accordingly, it is considered that the cycle characteristic of the cell was significantly degraded.

By contrast, in the cell A of the present invention, an yttrium compound is added in the positive electrode, and therefore, at the late stage of charging, little oxygen is generated from the positive electrode even at high temperature. In addition, a copper compound, which serves as a conductivity enhancer, is contained in the negative electrode, and therefore a current collecting performance is sufficiently maintained throughout even after many cycles are repeated. It is considered that an excellent cycle characteristic was obtained as a result of the foregoing.

EXPERIMENT 3

Cells B1 to B7 of the present invention were prepared in the same manner as in the foregoing Example except that $Ca(OH)_2$, $Bi_2O_3$, $Yb_2O_3$, $MnO_2$, $CuO$, $Sc_2O_3$, or $ZrO_2$ was respectively employed in place of yttrium sesquioxide. Using the cells B1 to B7 of the present invention, a high-temperature charge rate R of each cell was measured in the same manner as in the foregoing Experiment 1. The result is shown in Table 2.

TABLE 2

| Cell | Additive | High-temperature Charge Rate R (%) |
|---|---|---|
| Cell B1 | $Ca(OH)_2$ | 57 |
| Cell B2 | $Bi_2O_3$ | 58 |
| Cell B3 | $Yb_2O_3$ | 58 |
| Cell B4 | $MnO_2$ | 59 |
| Cell B5 | CuO | 58 |

TABLE 2-continued

| Cell | Additive | High-temperature Charge Rate R (%) |
|---|---|---|
| Cell B6 | $Sc_2O_3$ | 57 |
| Cell B7 | $ZrO_2$ | 57 |

In the cells B1 to B7 of the present invention, a calcium compound ($Ca(OH)_2$), a bismuth compound ($Bi_2O_3$), an ytterbium compound ($Yb_2O_3$), a manganese compound (MnO2), a copper compound (CuO), a scandium compound ($Sc_2O_3$), and a zirconium compound ($ZrO_2$), are respectively added. It is recognized that the cells B1 to B7 of the present invention exhibit an increased high-temperature charge rate in comparison with a comparative cell X1, in which the positive electrode contains no such additives, although the increase is not as large as that of the cell A, in which an yttrium compound ($Y_2O_3$) is added.

EXPERIMENT 4

In order to determine the optimum amounts of the additives, cells having varying amounts of an yttrium compound ($Y_2O_3$) to be added and varying amounts of copper compound ($Cu_2O$) to be added were prepared, and using these cells, a high-temperature charge characteristic of each of the cells was measured. The result is shown in Table 3. Each of the values in Table 3 is a value of a discharge capacity C2 obtained under the charge-discharge conditions as in the foregoing Experiment 1.

TABLE 3

| | | Amount of $Y_2O_3$ (wt. %) | | | |
|---|---|---|---|---|---|
| | 0 | 0.2 | 1 | 10 | 20 |
| Amount of $Cu_2O$ (wt. %) 0 | 485 mAh | 640 mAh | 640 mAh | 640 mAh | 570 mAh |
| 0.5 | — | 645 mAh | 665 mAh | 645 mAh | — |
| 10 | 490 mAh | — | 685 mAh | — | — |
| 20 | — | 645 mAh | 645 mAh | 645 mAh | — |
| 25 | — | 600 mAh | 605 mAh | 605 mAh | — |

As seen from Table 3, the amount of an yttrium compound to be added is preferable to be 0.2–10 wt. %, and the amount of a copper compound to be added is preferable to be 0.5–20 wt. %.

The ranges stated above are preferable for the following reason. On the one hand, in the case where the amount of an yttrium compound is less than 0.2 wt. % and the amount of an copper compound is less than 0.5 wt. %, the effects by adding these compounds cannot be sufficiently exhibited. On the other hand, in the case where the amount of an yttrium compound exceeds 10 wt. %, the amount of nickel hydroxide, the positive electrode active material, becomes small in the positive electrode, and in the case where the amount of a copper compound exceeds 20 wt. %, the amount of hydrogen-absorbing alloy, the negative electrode active material, becomes small in the negative electrode, and therefore, both cases result in a decrease in the cell capacity.

INDUSTRIAL APPLICABILITY

As has been described thus far, according to the present invention, utilization factors at high temperature of both positive and negative electrode active materials are improved, and a decrease in an electrode capacity at high temperature is minimized. As a result, it is made possible to obtain such a remarkable advantage that a cell performance, as a total of the performances of positive and negative electrodes, is significantly improved. Hence, the present invention is useful in the industry.

What is claimed is:

1. A nickel-meal hydride storage cell comprising in a cell case, a positive electrode comprising a positive electrode active material composed mainly of nickel hydroxide powder a negative electrode comprising a negative electrode active material composed mainly of hydrogen-absorbing alloy powder and a separator interposed between the positive and negative electrodes and impregnated with an electrolyte, said nickel-metal hydride storage cell characterized in that:

said negative electrode active material contains an oxide or hydroxide of copper; and said positive electrode active material contains at least one compound selected from the group consisting of an oxide or hydroxide of one of bismuth, calcium, ytterbium, manganese, copper, scandium, and zirconium.

2. A nickel-metal hydride storage cell according to claim 1, in which said positive electrode active material comprises an aggregate of coated particles each in which a coating layer comprising a sodium-containing cobalt compound is formed on a surface of a nickel hydroxide particle, and said positive electrode active material is such that said oxide or hydroxide of one of bismuth, calcium, ytterbium, manganese, copper, scandium, and zirconium, is added to said aggregate of coated particles.

3. A nickel-metal hydride storage cell comprising in a cell case, a positive electrode comprising a positive electrode active material composed mainly of nickel hydroxide powder, a negative electrode comprising a negative electrode active material composed mainly of hydrogen-absorbing alloy powder, and a separator interposed between the positive and negative electrodes and impregnated with an electrolyte, said nickel-metal hydride storage cell characterized in that:

said negative electrode active material contains a copper compound, and said positive electrode active material is such that an yttrium compound is added to an aggregate of coated particles each in which a coating layer comprising a sodium-containing cobalt compound is formed on a surface of a nickel hydroxide particle.

4. A nickel-metal hydride storage cell according to claim 3, in which the yttrium compound is an oxide or hydroxide of yttrium.

5. A nickel-metal hydride storage cell according to claim 4, an amount of the yttrium compound to be contained is 0.2 to 10 wt. % based on the weight of the positive electrode active material.

6. A nickel-metal hydride storage cell according to claim 5, in which the copper compound is an oxide or hydroxide of copper.

7. A nickel-metal hydride storage cell according to claim 6, in which an amount of the copper compound to be contained is 0.5 to 20 wt. % based on the weight of the negative electrode active material.

8. A nickel-metal hydride storage cell comprising in a cell case, a positive electrode comprising a positive electrode active material composed mainly of nickel hydroxide powder, a negative electrode comprising a negative electrode active material composed mainly of hydrogen-absorbing alloy powder and a separator interposed between the positive and negative electrodes and impregnated with an electrolyte said nickel-metal hydride storage cell characterized in that:

said negative electrode active material contains a copper compound, and said positive electrode active material contains at least one compound selected from the group consisting of bismuth compound ytterbium compound scandium compound, and zirconium compound.

9. A nickel-metal hydride storage cell according to claim 8, in which said at least one compound is an oxide or hydroxide of one of bismuth ytterbium, scandium, and zirconium.

10. A nickel-metal hydride storage cell according to claim 9, in which said positive electrode active material comprises an aggregate of coated particles each in which a coating layer comprising a sodium-containing cobalt compound is formed on a surface of a nickel hydroxide particle and said positive electrode active material is such that said oxide or hydroxide of one of bismuth, ytterbium, scandium, and zirconium, is added to said aggregate of coated particles.

* * * * *

UNITED STATES PATENT AND TRADEMARK OFFICE
CERTIFICATE OF CORRECTION

PATENT NO. : 6,472,101 B1
DATED : October 29, 2002
INVENTOR(S) : Meada et al.

It is certified that error appears in the above-identified patent and that said Letters Patent is hereby corrected as shown below:

Title page,
Item [56], insert:
-- U.S. PATENT DOCUMENTS
5,455,125    10/3/95   Matsumoto et al.
5,506,076    4/9/96    Miyamoto et al. --

After last cited U.S. PATENT DOCUMENTS, insert:
--      FOREIGN PATENT DOCUMENTS
EU  0432342  A1  6/19/91
EU  0817291  A2  1/7/98
EU  0419220  A1  3/27/91
EU  0789408  A2  8/13/97 --

Column 2,
Line 45, change "configuration, the at" to be -- configuration, at --

Column 3,
Line 63, change "the. copper" to be -- the copper --

Column 5,
Line 4, change "used for-nickel-metal" to be -- used for nickel-metal --
Line 19, change "example thereof" to be -- example thereof. --

Column 6,
Line 8, change "was pulverized,.and" to be -- was pulverized, and --
Line 15, change "by, weight" to be -- by weight --
Line 42, change "foregoing-Example" to be -- foregoing Example --

Column 7,
Line 18, change "from-Table 1" to be -- from Table 1 --
Line 57, change "capacity 5 is" to be -- capacity is --

Column 8,
Line 7, change "P X1" to be -- PX1 --
Line 51, change "and achieved" to be -- and X3 achieved --

Column 9,
Line 33, change "negative," to be -- negative --

Column 10,
Line 12, change "(MnO2)" to be -- $(MnO_2)$ --

UNITED STATES PATENT AND TRADEMARK OFFICE
CERTIFICATE OF CORRECTION

PATENT NO.    : 6,472,101 B1
DATED         : October 29, 2002
INVENTOR(S)   : Meada et al.

It is certified that error appears in the above-identified patent and that said Letters Patent is hereby corrected as shown below:

Column 11,
Lines 9 and 10, change "powder a" to be -- powder, a --
Line 12, change "powder and" to be -- powder, and --

Column 12,
Line 23, change "powder and" to be -- powder, and --
Line 25, change "an electrolyte said" to be -- an electrolyte, said --
Line 31, change "bismuth compound ytterbium compound scandium"
to be -- bismuth compound, ytterbium compound, scandium --
Line 35, change "bismuth ytterbium" to be -- bismuth, ytterbium --
Line 41, change "hydroxide particle and" to be -- hydroxide particle, and --

Signed and Sealed this

Nineteenth Day of August, 2003

JAMES E. ROGAN
*Director of the United States Patent and Trademark Office*